(12) United States Patent
Hayakawa

(10) Patent No.: US 9,420,123 B2
(45) Date of Patent: Aug. 16, 2016

(54) INFORMATION PROCESSING APPARATUS INFORMATION PROCESSING METHOD, AND COMPUTER-READABLE STORAGE MEDIUM FOR REGISTERING ANOTHER APPARATUS

(71) Applicant: CANON KABUSHIKI KAISHA, Tokyo (JP)

(72) Inventor: Mizuki Hayakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/621,555

(22) Filed: Feb. 13, 2015

(65) Prior Publication Data

US 2015/0249755 A1   Sep. 3, 2015

(30) Foreign Application Priority Data

Feb. 28, 2014   (JP) ................. 2014-039291

(51) Int. Cl.
*H04N 1/00* (2006.01)
*H04N 1/32* (2006.01)

(52) U.S. Cl.
CPC ....... *H04N 1/00228* (2013.01); *H04N 1/32037* (2013.01); *H04N 1/32101* (2013.01); *H04N 1/32539* (2013.01); *H04N 1/32566* (2013.01)

(58) Field of Classification Search
CPC .................................. H04N 1/00228
See application file for complete search history.

(56) References Cited

U.S. PATENT DOCUMENTS

| | | | | |
|---|---|---|---|---|
| 7,020,781 B1 * | 3/2006 | Saw | .............. | G06F 21/608 705/51 |
| 2005/0141041 A1 * | 6/2005 | Jung | .............. | H04N 1/32112 358/401 |
| 2005/0174606 A1 * | 8/2005 | Matsueda | .............. | H04N 1/00209 358/402 |
| 2005/0198072 A1 * | 9/2005 | Iinuma | .............. | H04N 1/00225 |
| 2006/0044624 A1 * | 3/2006 | Chapin | .............. | H04N 1/00222 358/474 |
| 2006/0195552 A1 * | 8/2006 | Nampei | .............. | H04N 1/00204 709/218 |
| 2006/0230282 A1 * | 10/2006 | Hausler | .............. | G06F 21/6218 713/182 |
| 2006/0293765 A1 * | 12/2006 | Tanaka | .............. | H04N 1/00408 700/15 |
| 2007/0247660 A1 * | 10/2007 | Nuggehalli | .............. | G06F 21/608 358/1.15 |
| 2010/0174751 A1 * | 7/2010 | Kawano | .............. | G06F 21/6218 707/784 |
| 2010/0259799 A1 * | 10/2010 | Shibao | .............. | H04N 1/00228 358/448 |
| 2012/0086965 A1 * | 4/2012 | Kang | .............. | G06F 3/1204 358/1.13 |
| 2013/0305341 A1 * | 11/2013 | Baker | .............. | H04L 41/0809 726/11 |
| 2014/0164436 A1 | 6/2014 | Hayakawa | .............. | G06F 21/6218 |
| 2015/0248600 A1 * | 9/2015 | Delaney | .............. | G06F 3/1238 358/1.14 |

FOREIGN PATENT DOCUMENTS

JP   2013-74366 A   4/2013

* cited by examiner

*Primary Examiner* — Ming Hon
(74) *Attorney, Agent, or Firm* — Fitzpatrick, Cella, Harper & Scinto

(57) ABSTRACT

Registration is performed so as to allow an information processing apparatus to use predetermined processing of a predetermined device. The registration state of another information processing apparatus capable of using the predetermine device is confirmed by communicating with the other information processing apparatus. In accordance with a confirmation result, deregistration processing is performed to deregister another information processing apparatus already registered as an apparatus which uses the predetermined processing of the predetermined device. If the confirmation result indicates that there is another information processing apparatus already registered, registration is performed based on deregistration processing.

20 Claims, 14 Drawing Sheets

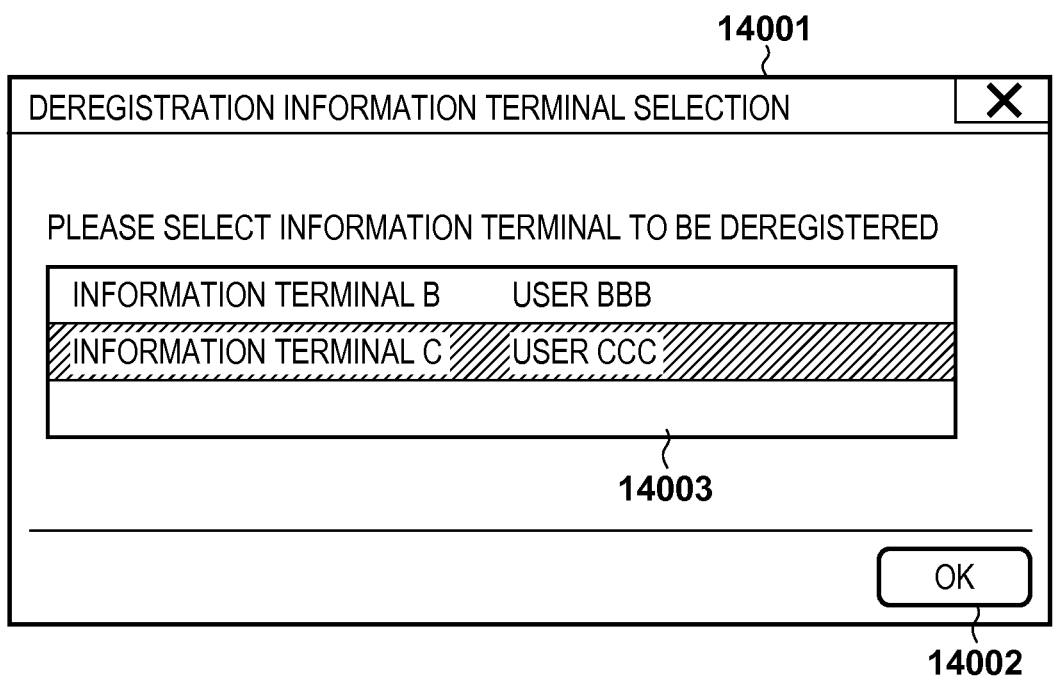
F I G. 14

FIG. 16

```
<soap:Envelope xmlns:soap="http://www.w3.org/2003/05/soap-envelope"
 xmlns:wsa="http://schemas.xmlsoap.org/ws/2004/08/addressing"
 xmlns:wscn="http://schemas.yyyy.xxx/YYYY/MM/wdp/scan">
<soap:Header>
   <wsa:Action>http://schemas.yyyy.xxx/YYYY/MM/wdp/scan/GetScannerElements</wsa:Action>
   <wsa:MessageID>%MESSAGE_ID%</wsa:MessageID>
   <wsa:ReplyTo>%REPLY_TO%</wsa:ReplyTo>
   <wsa:From>%FROM%</wsa:From>
</soap:Header>
<soap:Body>
   <wscn:GetScannerElementsRequest>
     <wscn:RequestedElements>
        <wscn:Name>wscn:ScannerDescription</wscn:Name>   ~ 16001
     </wscn:RequestedElements>
   </wscn:GetScannerElementsRequest>
</soap:Body>
</soap:Envelope>
```

FIG. 17

```
<env:Envelope xmlns:env="http://www.w3.org/2003/05/soap-envelope"
xmlns:wsa="http://schemas.xmlsoap.org/ws/2004/08/addressing"
xmlns:wscn="http://schemas.yyyy.xxx/YYYY/MM/wdp/scan"
xmlns:ans="http://www.abc.xxx/ns/wdp/scan/v100">
<env:Header>
   <wsa:Action>http://schemas.yyyy.xxx/YYYY/MM/wdp/scan/GetScannerElementsResponse</wsa:Action>
   <wsa:MessageID>%MESSAGE_ID%</wsa:MessageID>
   <wsa:RelatesTo>%RELATES_TO%</wsa:RelatesTo>
   <wsa:To>%TO%</wsa:To>
</env:Header>
<env:Body>
   <wscn:GetScannerElementsResponse>
      <wscn:ScannerElements>
         <wscn:ElementData Name= 'wscn:ScannerDescription' 'Valid= true'>
            <wscn:ScannerDescription>
               <wscn:DeviceId>
                  MFG:ABC;CMD:ABCCommand;MDL:Kmmn;CLS:SCANNER;DES:ABC Kmmn;VER:1.00;INFO:000;
               </wscn:DeviceId>
               <ans:AvailableSubscriptionUnits>1</ans:AvailableSubscriptionUnits>    ~17001
            </wscn:ScannerDescription>
         </wscn:ElementData>
      </wscn:ScannerElements>
   </wscn:GetScannerElementsResponse>
</env:Body>
</env:Envelope>
```

INFORMATION PROCESSING APPARATUS INFORMATION PROCESSING METHOD, AND COMPUTER-READABLE STORAGE MEDIUM FOR REGISTERING ANOTHER APPARATUS

BACKGROUND OF THE INVENTION

1. Field of the Invention

The present invention relates to an information processing technique which uses predetermined processing by a predetermined device.

2. Description of the Related Art

Some conventional image reading apparatuses connected on a network have a scan function of transmitting, to an information terminal apparatus such as a PC, data (to be referred to as scan data, image data, or document data) generated by reading a document. An example of the scan function is a push scan function. The push scan function is a function of transmitting scan data to an information terminal apparatus by a user operation to an image reading apparatus.

There may be a plurality of transmission destination candidates to which scan data is transmitted by the push scan function. For example, this is a case in which a plurality of information terminal apparatuses are connected to an image reading apparatus. Japanese Patent Laid-Open No. 2013-074366 describes a technique of registering a scan data transmission destination in an image reading apparatus. Japanese Patent Laid-Open No. 2013-074366 also describes a technique in which if the number of destinations has reached the upper limit when a request to newly register a destination is received from a host computer, the host computer is notified of a registration failure.

According to Japanese Patent Laid-Open No. 2013-074366, however, even if an attempt to newly register a scan data transmission destination is made, if the number of transmission destinations has reached the upper limit, registration fails. Consequently, the user cannot register a desired transmission destination in some cases.

SUMMARY OF THE INVENTION

The present invention provides an information processing technique capable of appropriately performing registration to use predetermined processing by a predetermined device.

To achieve the above object, an information processing apparatus according to the present invention has the following arrangement. That is, an information processing apparatus which uses predetermined processing by a predetermined device, comprising: a registration unit configured to perform registration so as to allow the information processing apparatus to use the predetermined processing of the predetermined device; a confirmation unit configured to confirm a registration state of another information processing apparatus capable of using the predetermined device by communicating with the other information processing apparatus; and a deregistration unit configured to perform, based on a confirmation result of the confirmation unit, deregistration processing for deregistering another information processing apparatus already registered as an apparatus which uses the predetermined processing of the predetermined device, wherein in a case that the confirmation result of the confirmation unit indicates that there is the other information processing apparatus already registered, the registration unit performs the registration based on the deregistration processing by the deregistration unit.

According to the present invention, an information processing apparatus performs registration based on deregistration processing for deregistering another information processing apparatus already registered. This makes it possible to appropriately perform registration to use predetermined processing by a predetermined device.

Further features of the present invention will become apparent from the following description of exemplary embodiments (with reference to the attached drawings).

BRIEF DESCRIPTION OF THE DRAWINGS

FIG. 14 is a view showing a user interface according to the third embodiment;

FIG. 16 is a view showing contents of a GetScannerElements message according to the fourth embodiment; and FIG. 17 is a view showing contents of a GetScannerElementsResponse message according to the fourth embodiment.

DESCRIPTION OF THE EMBODIMENTS

Embodiments of the present invention will be described in detail below with reference to the accompanying drawings.

<First Embodiment>

Figure 1:
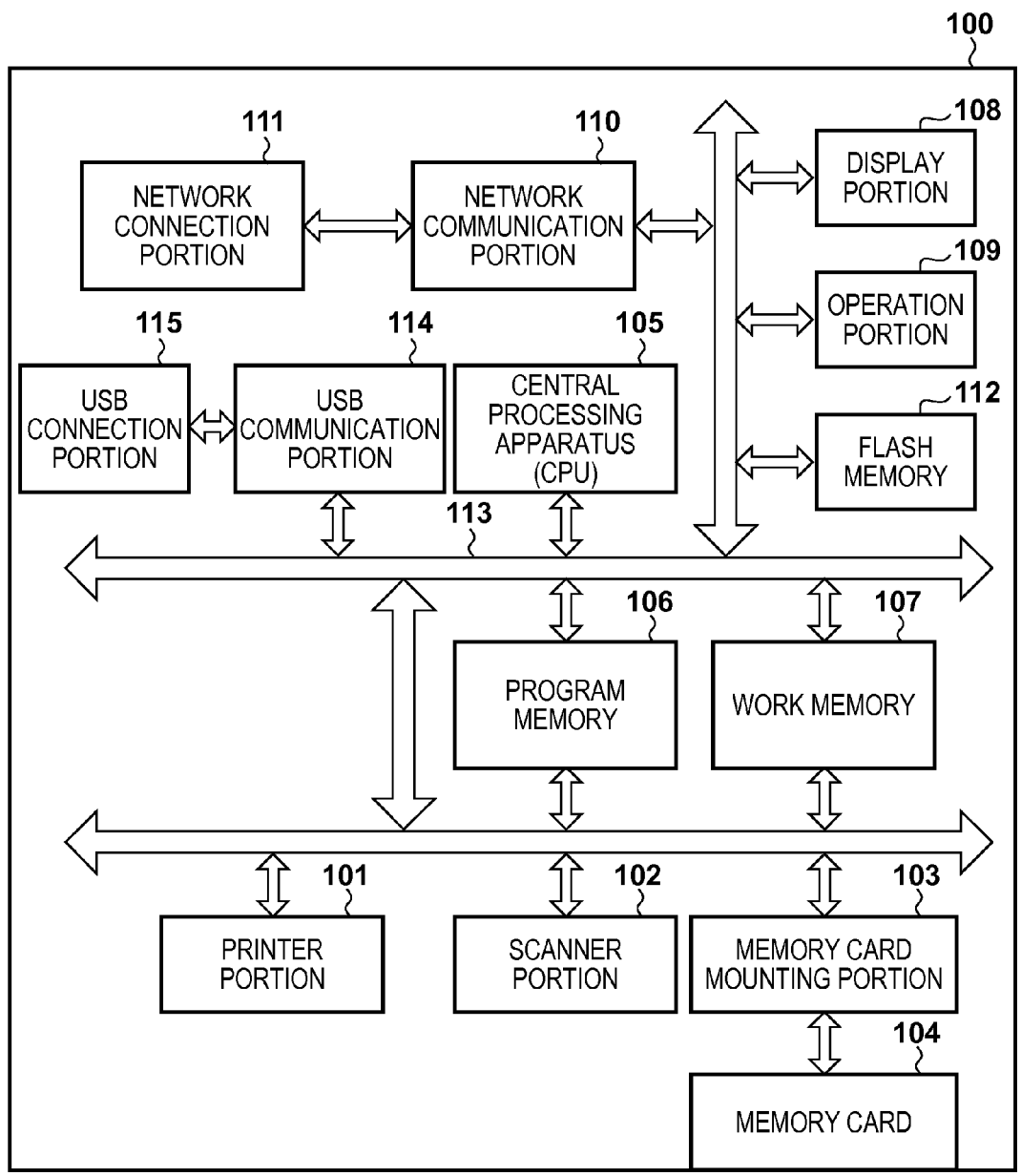
FIG. 1 is a block diagram showing the arrangement of an image forming apparatus according to the first embodiment.

FIG. 1 is a block diagram showing the schematic arrangement of an image forming apparatus 100. The image forming apparatus 100 has a printer function, scanner function, and storage function, and can provide respective function services via a network.

In the image forming apparatus 100, the printer function is implemented by a printer portion 101. A scanner portion 102 operates as an image reading apparatus to implement the scanner function. The storage function is implemented by a memory card mounting portion 103 and a memory card 104.

Furthermore, it is possible to implement a copy function by combining the printer function and the scanner function.

The printer portion 101 prints data such as externally received print data or image data stored in the memory card 104 on printing paper by a printing method such as an inkjet method or electrophotographic method. The scanner portion 102 optically reads a document set on a document table, converts it into electronic data, further converts the electronic data into a designated file format, and transmits the resultant data to an external apparatus via a network. The copy service transfers, to the printer portion 101, image data generated by reading a document set on the document table by the scanner portion 102, and prints the document data on printing paper by the printer portion 101. An external apparatus connected via a network can read out a file stored in the memory card 104, edit it, and store it in the memory card 104.

The image forming apparatus 100 also includes a central processing apparatus (CPU) 105 for controlling various components, and a program memory 106 such as a ROM which stores data such as program codes to be read out by the central processing apparatus 105. Furthermore, the image forming apparatus 100 includes a work memory 107 such as a RAM for temporarily storing or buffering data such as image data in executing each service. The image forming apparatus 100 includes a display portion 108 such as an LCD, and an operation portion 109 with respective switches (including a push scan switch) and a touch panel. The central processing apparatus 105 can implement various kinds of processes (to be described later) by executing programs stored in the program memory 106 on the work memory 107.

Furthermore, the image forming apparatus 100 includes a network communication portion 110 for connecting the image forming apparatus 100 to a network to perform various communications, and a network connection portion 111 for connecting the network communication portion 110 to a network medium. The network communication portion 110 copes with at least one of a wired network and wireless network. The wired network-compatible network connection portion 111 serves as a connector for connecting a wired network cable to the image forming apparatus 100. The wireless network-compatible network connection portion 111 serves as an antenna. Note that the wired network-compatible network connection portion 111 is connected to an external apparatus via a wired LAN. The wireless network-compatible network connection portion 111 is connected to an external apparatus by various methods such as wireless LAN, Bluetooth®, NFC (Near Field Communication), and infrared communication.

Furthermore, the image forming apparatus 100 includes a flash memory 112 serving as a nonvolatile memory which can store transmission source information of a packet received by the network communication portion 110. The image forming apparatus 100 also includes a USB (Universal Serial Bus) communication portion 114 for communicating with an information terminal 200 (FIG. 2) via a USB interface. The image forming apparatus 100 is connected to the information terminal 200 via a USB connection portion 115 formed by a connector such as a USB connector. Note that the information terminal 200 may be connected to the image forming apparatus 100 via the network communication portion 110 and the network connection portion 111 by wired or wireless connection.

A signal line 113 connects the various components of the image forming apparatus 100 to each other. As described above, the image forming apparatus serves as an image processing apparatus which processes an image by the printer function, scanner function, and storage function, and also serves as an image reading apparatus which reads an image by the scanner function.

Figure 2:
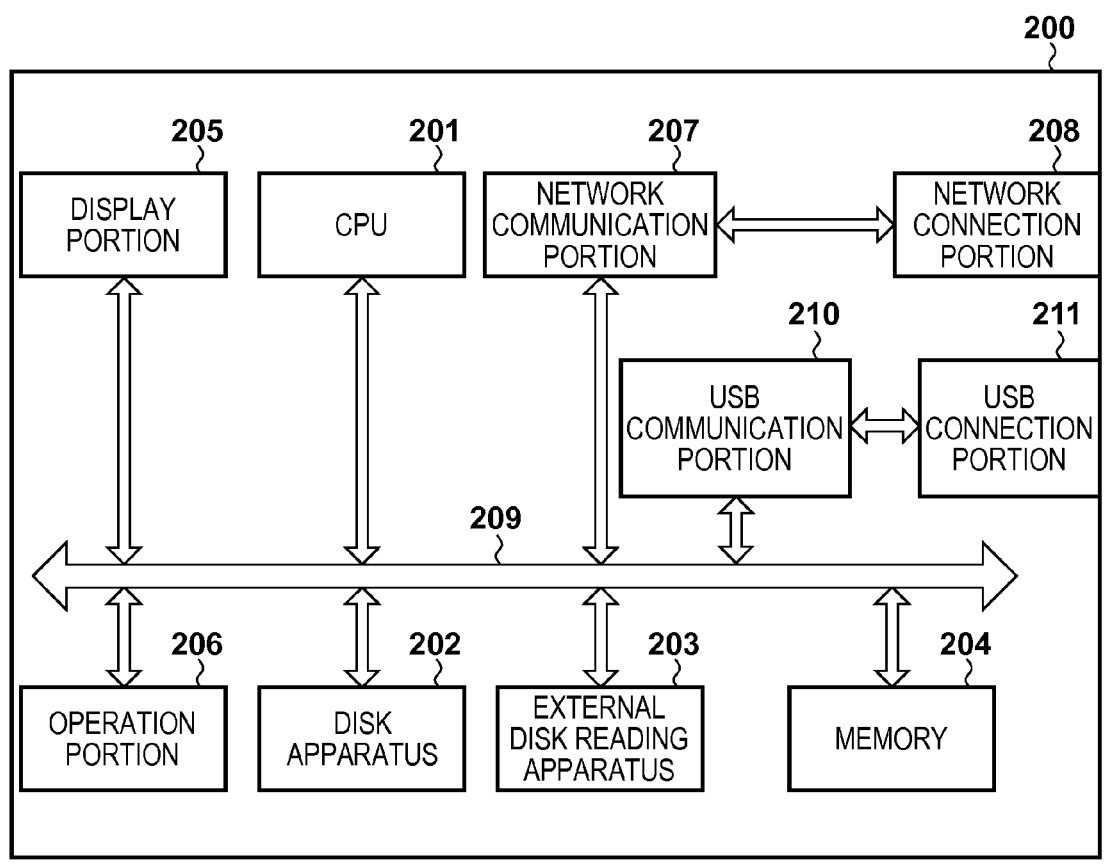
FIG. 2 is a block diagram showing the arrangement of an information terminal according to the first embodiment.

FIG. 2 is a block diagram showing the schematic arrangement of the information terminal 200. The information terminal 200 can implement various kinds of processes (to be described below) by, for example, installing predetermined software in an information processing apparatus such as a general-purpose PC.

Referring to FIG. 2, a CPU 201 controls various components of the information terminal 200. A disk apparatus 202 installs an OS (Operating System) and application programs read out by the CPU 201, and stores data such as various files. An external disk reading apparatus 203 reads out contents in an external storage medium such as a CD-ROM. A memory 204 is used by the CPU 201 to perform processing such as temporal storage and buffering of data, as needed. The CPU 201 can implement various kinds of processes (to be described later) by executing various programs stored in the disk apparatus 202 on the memory 204.

When the CPU 201 executes a software setup program for using the image forming apparatus 100 from the information terminal 200, the various programs are installed in the information terminal 200. The various programs stored in the disk apparatus 202 include various device drivers such as a scanner driver for using the scan function and a printer driver for using the printer function. The various programs also include various applications such as a polling application for inquiring about the state (the presence/absence of an event or the like) of the image forming apparatus 100 and management software (button monitor) for managing the state (status) of the image forming apparatus 100.

A display portion 205 includes an LCD. An operation portion 206 is implemented by a keyboard and mouse, or a touch panel. A network communication portion 207 performs various communications by connecting the information terminal 200 to a network. A network connection portion 208 connects the network communication portion 207 to a network medium. The information terminal 200 is connectable to the network connection portion 111 of the image forming apparatus 100 via the network connection portion 208.

Similarly to the image forming apparatus 100, the network communication portion 207 and network connection portion 208 cope with at least one of a wired network and wireless network. As a concrete form of them, the network communication portion 207 and network connection portion 208 take a necessary function and form in accordance with a compatible network, similarly to the network communication portion 110 and network connection portion 111 incorporated in the image forming apparatus 100. A signal line 209 connects the various components. A USB communication portion 210 communicates with various peripheral apparatuses via a USB interface. A USB connection portion 211 includes a USB connector. The information terminal 200 is connectable to the USB connection portion 115 of the image forming apparatus 100 via the USB connection portion 211.

In this way, a processing system can be formed by connecting the image forming apparatus 100 and the information terminal 200 via a network. An example of the network is a LAN (Local Area Network). Although a network formed from a network using a wired network cable will be exemplified below, the present invention is not limited to this. The form of the network remains the same regardless of whether it is a wireless network or a network including both a wired network and a wireless network. An example of the image forming apparatus 100 is an MFP. However, the image forming apparatus 100 need not always be an MFP, and may be an image scanner or digital camera.

Figure 3:
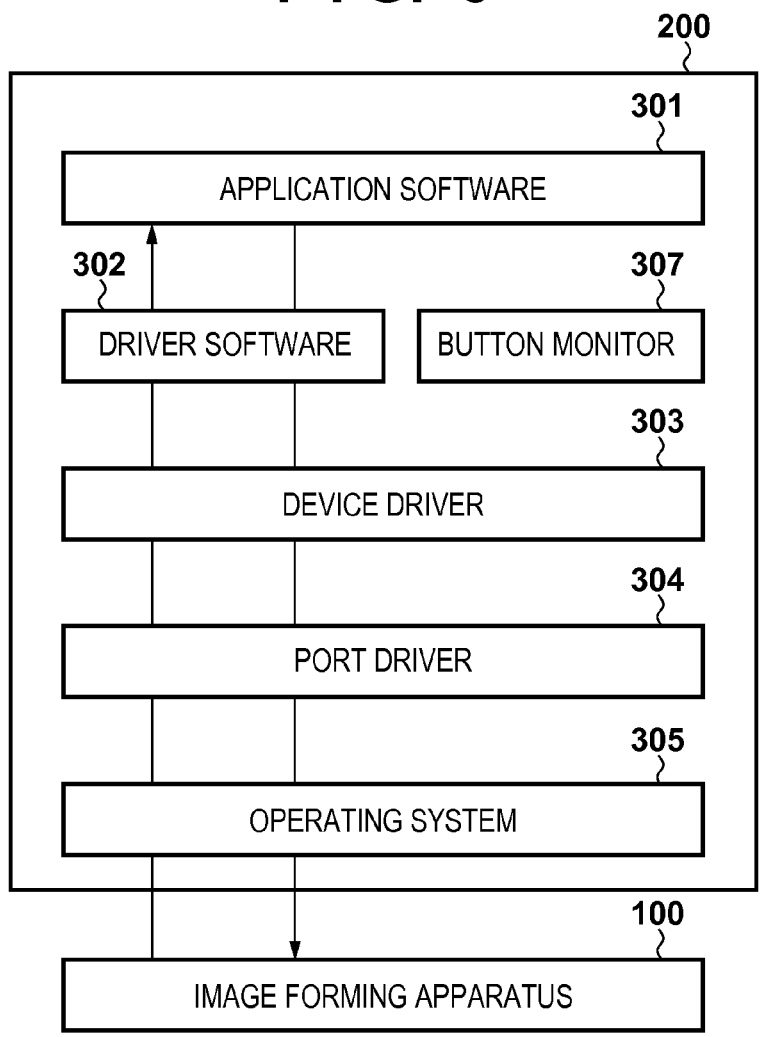
FIG. 3 is a block diagram showing a software arrangement according to the first embodiment.

FIG. 3 is a block diagram showing a software arrangement for controlling the image forming apparatus 100. Various programs shown in FIG. 3 are stored in the disk apparatus 202 of the information terminal 200 and executed by the CPU 201.

Application software 301 designates scan settings such as a scan method, color settings, and resolution settings, and instructs driver software 302 to acquire an image by using an application programming interface (API). Note that the application software 301 can implement both the pull scan function and push scan function. In the pull scan function, in response to a user operation to the information terminal 200, the application software 301 can make scan settings and issue a scan instruction to the image forming apparatus 100, as described above. In the push scan function, in response to a user operation to the image forming apparatus 100, the application software 301 can cause the image forming apparatus 100 to read a document and acquire an image obtained by the reading operation. The application software 301 can register the scan settings of the push scan function in the image forming apparatus 100. The push scan function will be described in detail later. The application software 301 has a function of setting the function of the operation portion 109 of the image forming apparatus 100 and saving files in various formats.

Note that examples of the API are TWAIN and WIA (OS standard image input APIs employed by Microsoft for WindowsMe® and subsequent versions of Windows) and interfaces based on standards unique to venders.

The driver software 302 can transfer the image acquired from the image forming apparatus 100 to the application software 301 and display a unique GUI (Graphical User Interface). The GUI has a function of, for example, previewing an image, designating a crop area with respect to a preview image, setting a resolution, setting a reading mode (a binary mode, 8-bit multi-level mode, 24-bit multi-level mode, or the like), and setting color adjustment such as gamma correction.

A device driver 303 acquires an image by transmitting a control command for controlling a program incorporated in the image forming apparatus 100 to the image forming apparatus 100. For the image forming apparatus 100 which incorporates no firmware, the device driver 303 performs various types of control by accessing the control registers of the respective modules of the image forming apparatus 100. For example, the device driver 303 performs shading control, motor speed setting in accordance with a resolution and a crop range, transmission processing of gamma correction data received from the driver software 302 to the image forming apparatus 100, and sequence control for image reading.

A port driver 304 performs communication control with the image forming apparatus 100 in accordance with an interface such as a parallel interface, USB interface, IEEE1394 interface, SCSI interface, LAN interface, wired LAN interface, or wireless LAN interface. An operating system (OS) 305 is, for example, a basic system of the information terminal 200 such as Windows®. A button monitor 307 is a module which detects whether a given button on the operation portion 109 of the image forming apparatus 100 has been pressed.

In this embodiment, a polling-based push scan is adopted as an example of a push scan. The button monitor 307 always detects (performs polling), at given intervals, whether a button has been pressed in the image forming apparatus 100. For example, the button monitor 307 detects whether the push scan instruction button of the image forming apparatus 100 has been pressed. Upon detecting that the button has been pressed, the button monitor 307 notifies the application software 301 of information of the pressed button. Upon receiving the notification, the application software 301 causes the image forming apparatus 100 to read a document under the conditions set for each button. More specifically, when the button monitor 307 detects that the button has been pressed, the application software 301 acquires a push scan instruction and scan settings from the image forming apparatus 100. Note that the scan settings are registered in the image forming apparatus 100 as settings in a push scan. The application software 301 then causes the image forming apparatus 100 to read a document according to the scan settings.

Even if the information terminal 200 and the image forming apparatus 100 are connected via USB and the image forming apparatus 100 operates as a USB device, it is possible to implement a push scan by the above-described polling-based push scan.

Note that this embodiment is also applicable to a method (event-based push scan) in which an image forming apparatus notifies all or specific information terminal apparatuses of occurrence of a push scan event.

Figure 4:
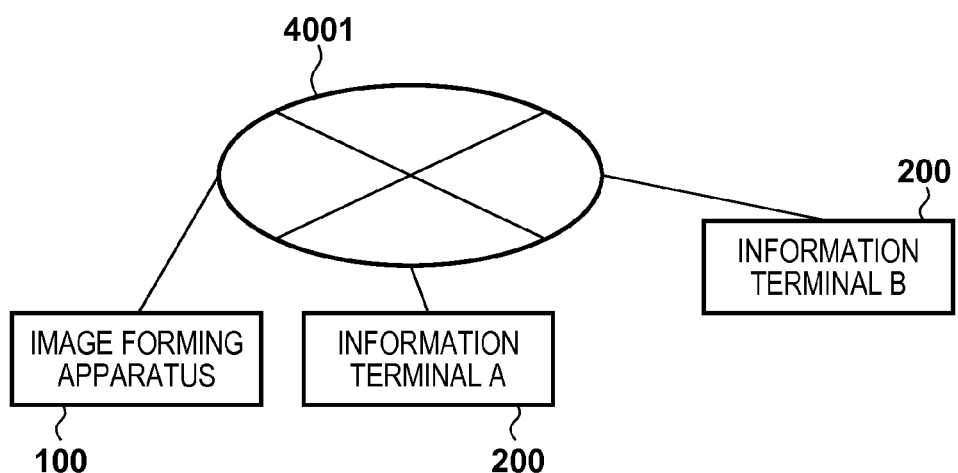
FIG. 4 is a block diagram showing a network according to the first embodiment.

FIG. 4 is a block diagram showing the schematic arrangement of a network system including the image forming apparatus 100 shown in FIG. 1 and the information terminal 200 shown in FIG. 2.

The image forming apparatus 100 and the plurality of information terminals 200 are connected to a local area network 4001. A case in which the apparatuses are connected to a wired network will be exemplified with reference to FIG. 4 and subsequent drawings. However, the apparatuses may be connected to a wireless network or a network including both a wired network and a wireless network.

The image forming apparatus 100 and the plurality of information terminals 200 (information terminals A and B) are connected on the local area network 4001. In the following description, the two information terminals 200 will be referred to as information terminals A and B to discriminate them. Note that the names are not limited to them, and the number of information terminals connected on the local area network 4001 is not limited to two.

In this embodiment, a push scan assumes that identification information for specifying the information terminal 200 is registered in advance in the image forming apparatus 100 and used. If no information terminal 200 is registered, a plurality of information terminals 200 may receive a push scan event notification, and a large number of unintended information terminals 200 may simultaneously perform reading control. In addition, the image forming apparatus 100 may unintentionally send a push scan event notification to the information terminal 200 which does not want to perform a push scan. To prevent these situations, the information terminal 200 as a push scan target is registered in the image forming apparatus 100, and a push scan event notification is sent to only the registered information terminal 200.

For example, a plurality of information terminals connected to a network can register themselves as scan data (read image) transmission destinations in an image forming apparatus, and the user can select an information terminal as a transmission destination in the image forming apparatus. In this case, a display device and user input device for selecting an information terminal are required. In the first embodiment, a case in which the upper limit number of registrable information terminals is one will be described. In this case, if an attempt to register the second information terminal in the image forming apparatus is made, the image forming apparatus may return an error, resulting in a registration failure.

To cope with this, the first embodiment provides an arrangement for registering an appropriate information terminal as a scan data transmission destination in a push scan. More specifically, an information terminal to be registered as described above is decided by communication between information terminals on a network. This arrangement will be described in detail below.

Processing when the information terminal 200 is registered/deregistered in/from the image forming apparatus 100 will be explained with reference to the flowchart of FIG. 5. Processing shown in FIG. 5 is implemented when the CPU 201 of the information terminal 200 executes the application software 301.

This flowchart is operable in all the information terminals 200 registrable in the image forming apparatus 100, and thus the expression "information terminal 200" is used instead of information terminal A or information terminal B. These expressions are used for different purposes in accordance with an information terminal registered in the image forming apparatus 100 or the situation and an information terminal (to be referred to as a registered terminal) registered in the image forming apparatus 100. More specifically, processing executed by cooperation of information terminals A and B will be described in detail with reference to the sequence charts of FIGS. 6 and 7.

Figure 5:
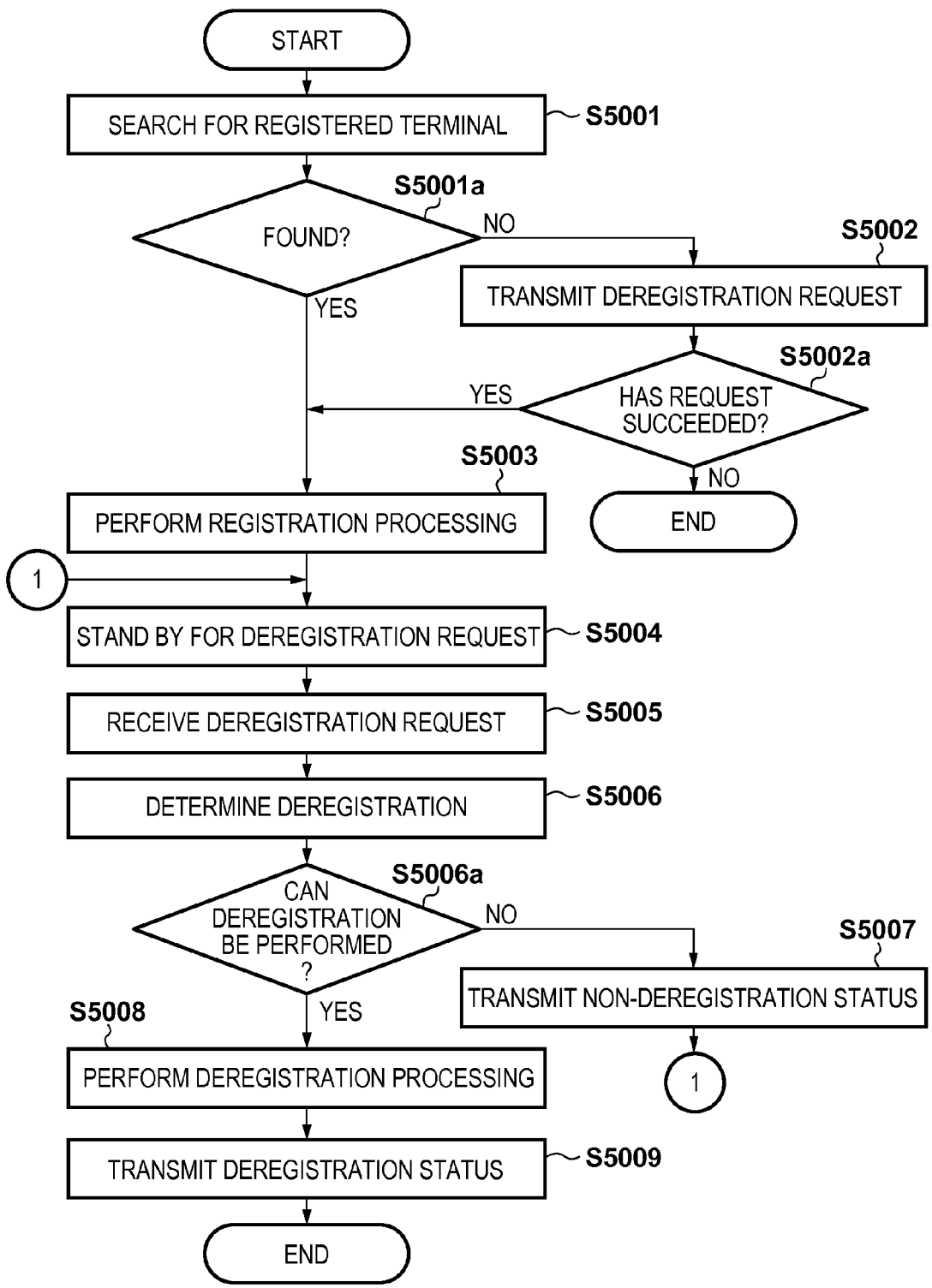
FIG. 5 is a flowchart according to the first embodiment.

The flowchart shown in FIG. 5 is executed when, for example, the application software 301 is activated, a transmission destination registration function is activated in a push scan, or a registered terminal search instruction (to be described later) is issued to register a transmission destination.

In S5001, the information terminal 200 searches for a registered terminal as a push scan transmission destination in the image forming apparatus 100 on the local area network 4001. For example, the information terminal 200 searches for a registered terminal using UDP (User Datagram Protocol) broadcast. A registered terminal stands by to listen to a UDP broadcast from the information terminal 200. Upon receiving the UDP broadcast, the registered terminal returns the information of itself to the information terminal 200. With this processing, the information terminal 200 searches for a registered terminal. In S5001a, based on the search result of the search processing, the information terminal 200 determines whether a registered terminal has been found. If a registered terminal has been found (YES in S5001a), the process advances to S5002. On the other hand, if no broadcast response has been received and no registered terminal has been found (NO in S5001a), it is determined that the information terminal 200 can be registered, and the process advances to S5003.

In S5002, the information terminal 200 transmits a deregistration request to the registered terminal found in S5001. In S5002a, based on a response to this request, the information terminal 200 determines whether the registered terminal has been deregistered. If the request has succeeded to allow registration (YES in S5002a), the process advances to S5003. On the other hand, if the request has failed to disable registration (NO in S5002a), the information terminal 200 terminates the registration processing by excluding itself from push scan targets.

Note that processing when a deregistration request is received will be described later in S5005 and subsequent steps.

Figure 8:
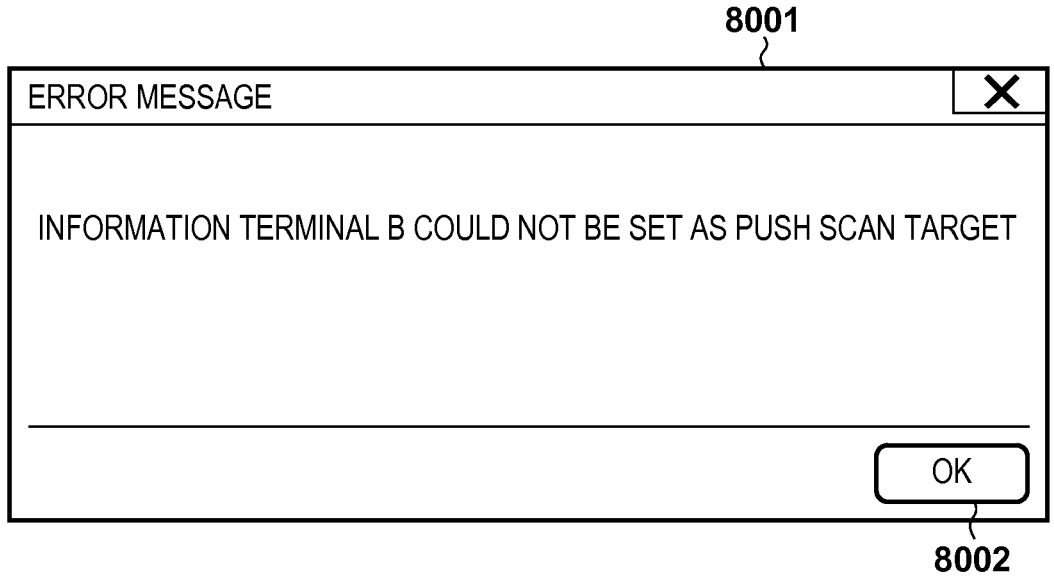
FIG. 8 is a view showing a user interface according to the first embodiment.

According to the flowchart of FIG. 5, if the user explicitly performs registration processing, for example, if the user issues a registration instruction, when NO is determined in S5002a, the information terminal 200 may display an error message 8001 shown in FIG. 8. In this case, the user of the information terminal 200 can finish the display by pressing an OK button 8002 after confirming contents of the error message 8001.

On the other hand, according to the flowchart of FIG. 5, the user may implicitly perform registration processing. For example, the application software 301 is activated and the information terminal is automatically registered at the time of login. In this case, data may be written in history information such as an internal log without displaying an error message so as to allow the user to confirm the information later. When transmitting a deregistration request, data necessary for deregistration determination (S5006) (to be described later) may be transmitted. For example, the necessary data includes a password for deregistration and setting data of the information terminal. This data may be included in data for transmitting a deregistration request, or a deregistration request may be transmitted to the registered terminal and necessary data may be transmitted according to the return value of the request, as needed.

In S5003, the information terminal 200 performs registration processing of registering itself in the image forming apparatus 100. Registration is completed by, for example, transmitting registration information necessary for registration to the image forming apparatus 100. This registration information includes, for example, identification information for specifying the information terminal 200. Upon receiving the registration information, the image forming apparatus 100 stores the registration information in the flash memory 112. A method of using the thus stored registration information will be described later. This registration information can implement control of transmitting scan data in a push scan to the registered terminal without performing transmission to an unregistered information terminal.

In S5004, the information terminal 200 stands by for reception of a deregistration request. As described in S5001, the information terminal 200 stands by to listen to the UDP broadcast. When another information terminal transmits a UDP broadcast, the processing is to register the other information terminal, resulting in reception of a deregistration request of the self information terminal (S5005). Note that in processing such as end processing of the registered terminal, the registered terminal may want to deregister itself. In this case, even if no other information terminal transmits a UDP broadcast, the registered terminal can deregister itself from the image forming apparatus 100 by terminating this step and performing processing in S5008 (to be described later).

In S5005, the information terminal 200 receives a deregistration request from another information terminal. If no deregistration request is received in S5005, the information terminal 200 continues the deregistration request standby state in S5004. Note that the deregistration request in S5005 is information similar to the deregistration request transmitted by the information terminal 200 in S5002, and the deregistration request transmitted by another information terminal on the network is received.

In S5006 and S5006a, based on the received deregistration request, the information terminal 200 determines whether deregistration is performed (deregistration determination). If deregistration cannot be performed (NO in S5006a), the process advances to S5007; otherwise (YES in S5006a), the process advances to S5008.

Note that as described in S5002, if there is other information necessary for deregistration, a request for the information is set in the return value of the deregistration request, as needed. For example, there are some determination conditions for deregistration determination in S5006 and S5006a, as follows.

The first determination condition indicates that deregistration is performed when a deregistration request is received. Since deregistration can be freely performed when the user wants to perform a push scan, this is effective in a small-scale network environment such as a home network.

Figure 9:
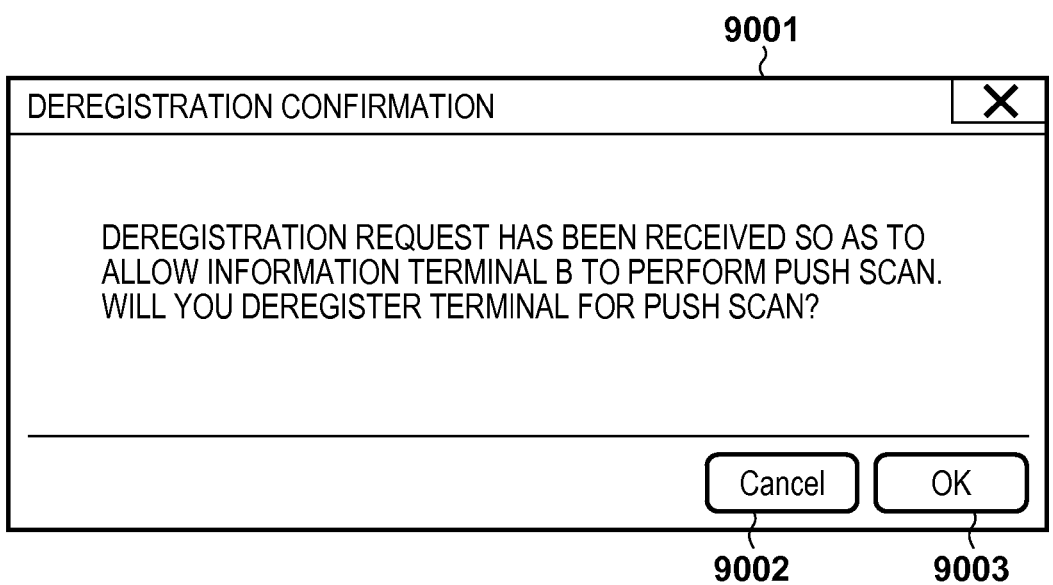
FIG. 9 is a view showing a user interface according to the first embodiment.

The second determination condition indicates that deregistration is performed when the user of the registered terminal confirms and permits deregistration. In this case, for example, a dialog 9001 shown in FIG. 9 is displayed on the display portion 205 of the registered terminal, and the user of the registered terminal confirms deregistration. Under this determination condition, it is possible to prevent deregistration unintended by the user. When the dialog 9001 is displayed on the display portion 205, if the user of the registered terminal permits deregistration, he/she can permit deregistration by pressing an OK button 9003. On the other hand, if the user does not permit deregistration, he/she can prohibit deregistration by pressing a Cancel button 9002. When either of the buttons is pressed, a message or information indicating it is transmitted to the information terminal 200 as the deregistration request source.

Figure 10:
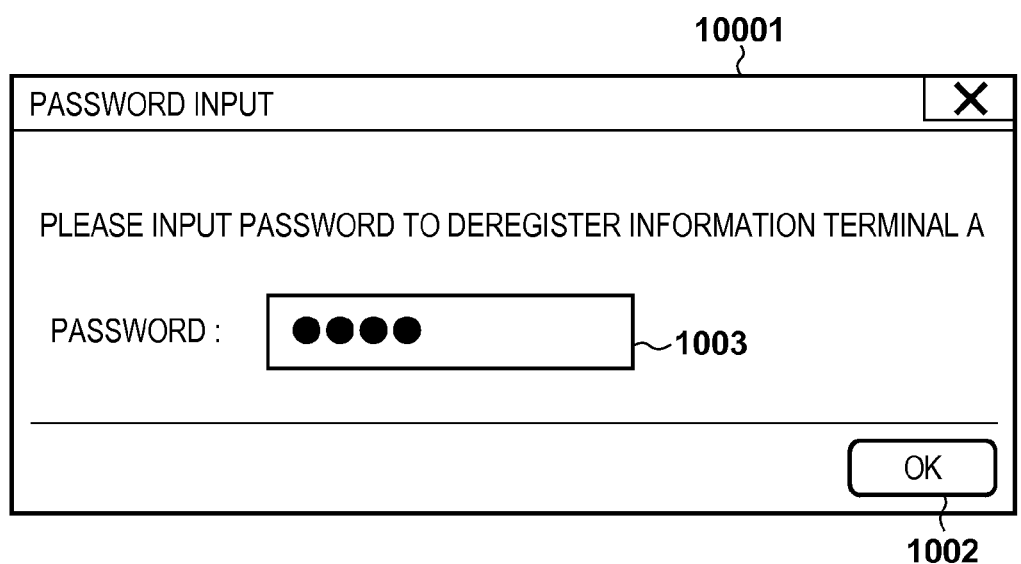
FIG. 10 is a view showing a user interface according to the first embodiment.

The third determination condition indicates that deregistration is performed when a password is set in advance in the registered terminal, the user of an information terminal to be registered is prompted to input a password, and then the input password coincides with the set password. For example, a dialog 10001 shown in FIG. 10 is displayed on the information terminal which has transmitted the deregistration request, and the user is prompted to input a password via an input field 1003 and press an OK button 1002. The information terminal which has transmitted the deregistration request transmits the password together with the deregistration request to the registered terminal. When the user inputs the password in the registered terminal which has received the password, it is determined to perform deregistration. This determination condition is effective when, for example, one user uses a plurality of information terminals, and only the user wants to switch a registration target terminal.

The fourth determination condition indicates that deregistration is performed depending on the state of the registered terminal. In a predetermined state (for example, a sleep state, a power supply state, or a working state in which an input device of the information terminal, such as a keyboard or mouse, operates), deregistration is performed. For example, when the user of the registered terminal is away from the registered terminal, deregistration cannot be performed under only the second determination condition. Under a combination of the second and fourth conditions, it is possible to perform deregistration when the user is away from the registered terminal and the registered terminal is in a speed state.

The fifth determination condition indicates that the registered terminal is deregistered when usable time information is set in the image forming apparatus for each user, and a predetermined condition (date/time condition) such as a use time period and a day of the week is satisfied. For example, the user of the image forming apparatus may be different depending on a specific time period such as a weekday or holiday. In this case, this determination condition is effective.

The sixth determination condition indicates that deregistration is performed depending on an elapsed time after the registered terminal used the image forming apparatus last time. When an operation to the image forming apparatus by the registered terminal satisfies a predetermined condition (operation condition), for example, when one hour has elapsed after a push scan was used last time, the probability that a push scan is executed next time is assumed to be low, thereby performing deregistration.

The seventh determination condition indicates that deregistration is performed depending on the use count. For example, the registered terminal can use the image forming apparatus a predetermined number of times (for example, five times) after the registered terminal is registered for a push scan. If another user wants to use the image forming apparatus after the registered terminal uses the image forming apparatus the predetermined number of times, the registered terminal is deregistered to allow the other user to use the image forming apparatus.

The eighth determination condition indicates that information terminals are switched depending on the installation time of a program for implementing the flowchart shown in FIG. 5. The installation times of the respective information terminals are compared with each other. Based on the comparison result, for example, the user who has installed the program first is prioritized.

The ninth determination condition indicates that deregistration is performed when priority levels are set for respective users or information terminals, and a deregistration request is received from the information terminal of a user with a higher priority level.

Note that the above determination conditions are merely examples, and a plurality of conditions can be used in combination in accordance with the use environment of the user. Therefore, it is possible to adaptively use determination conditions other than the above conditions.

Furthermore, the user can set the determination condition in a host apparatus (for example, the information terminal 200) connected to the image forming apparatus 100 via a communication interface (the network connection portion 111 or the USB connection portion 115). More specifically, the user can set the determination condition via the operation portion 206 by providing a user interface (UI) for setting the determination condition to the display portion 108 of the host apparatus (for example, the information terminal 200). This UI is displayed when, for example, the CPU 201 of the information terminal 200 executes the application software 301. Similarly, the UIs shown in FIGS. 8 to 10 are also displayed when the CPU 201 of the information terminal 200 executes the application software 301.

If it is determined in S5006a that deregistration cannot be performed, the information terminal 200 transmits, in S5007, a non-deregistration status as the return value of the deregistration request to the information terminal as the deregistration request source. In this case, the information terminal which has issued the deregistration request performs the processing in S5002a. When the registered terminal transmits the non-deregistration status in S5007, it is determined that the deregistration request has failed. As a result, only the information terminal 200 which is executing this step remains as a push scan target.

After that, the process advances to S5004, and the information terminal stands by for reception of a deregistration request again.

On the other hand, if it is determined in S5006a that deregistration can be performed, the information terminal 200 performs, in S5008, deregistration processing of deregistering itself from the image forming apparatus 100. For example, the information terminal 200 completes deregistration by transmitting information necessary for deregistration to the image forming apparatus 100.

In S5009, the information terminal 200 transmits a deregistration status as the return value of the deregistration request to the other information terminal. At this time, the other information terminal is performing the processing in S5002. When the registered information terminal transmits the deregistration status in S5009, the other information terminal determines that the deregistration request has succeeded. As result, the other information terminal executes the processes in S5003 and subsequent steps, and is registered as a push scan target.

Note that the deregistration status and non-deregistration status are managed in the memory 204 of the information terminal 200. The CPU 201 switches between the deregistration status and the non-deregistration status in accordance with exchange processing with another information terminal.

Figure 6:
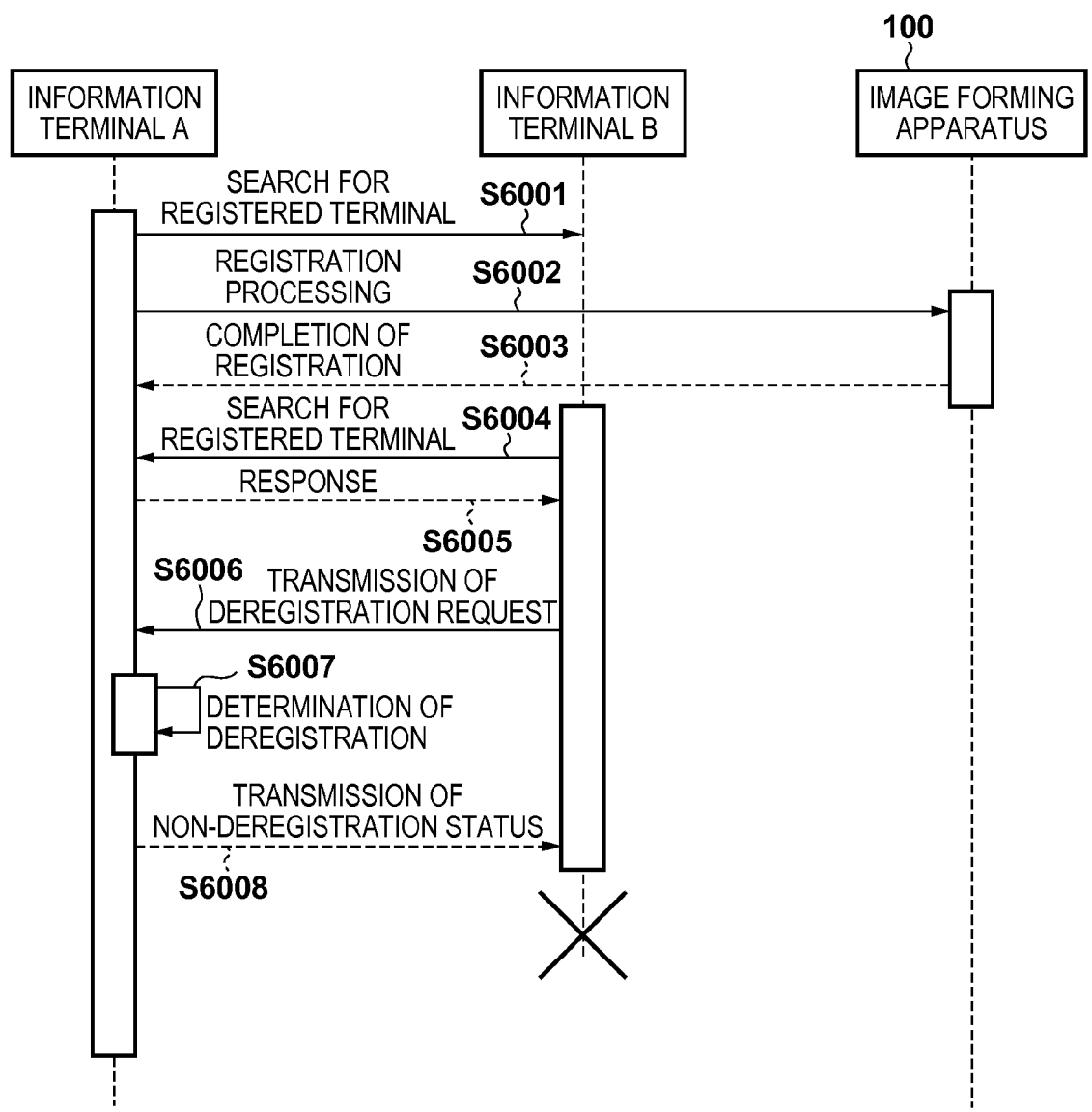
FIG. 6 is a sequence chart according to the first embodiment.
Figure 7:
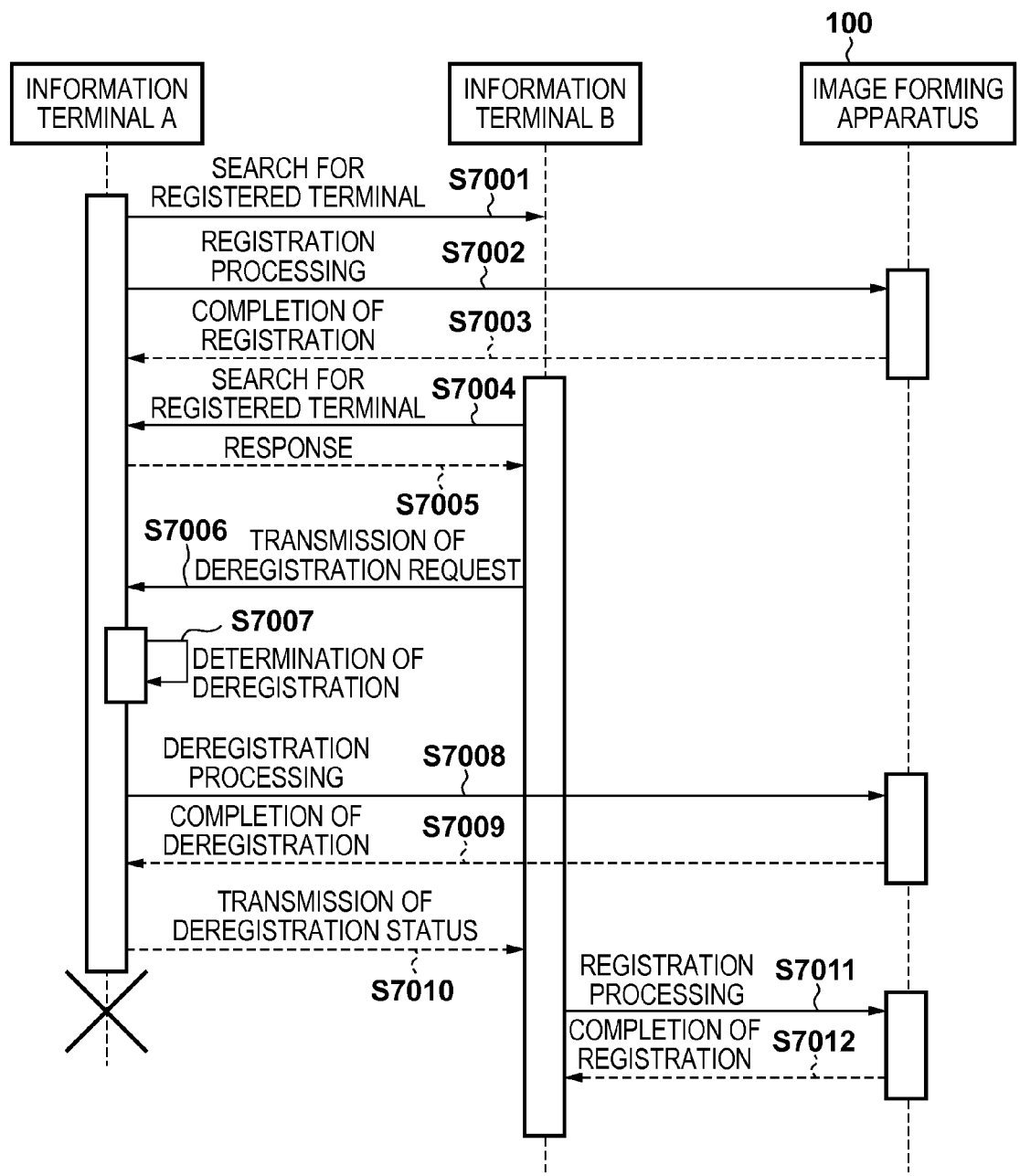
FIG. 7 is a sequence chart according to the first embodiment.

The sequence between the plurality of information terminals and the image forming apparatus will be described with reference to the sequence charts of FIGS. 6 and 7. FIG. 6 shows an example in which information terminal A is set as a push scan target, and is not deregistered in response to a deregistration request from information terminal B. FIG. 7 shows an example in which information terminal A is registered as a push scan target but information terminal B deregisters information terminal A later and is set as a push scan target.

Information terminal A searches for a registered terminal (S6001). This processing corresponds to S5001 of FIG. 5. Since information terminal B has not performed registration processing, there is no information terminal which responses to a UDP broadcast. It is then determined that there is no registered terminal, thereby performing the processing in S5003 of FIG. 5.

Information terminal A performs registration processing in the image forming apparatus 100 (S6002).

The image forming apparatus 100 determines that registration has succeeded, and returns a response (registration completion) (S6003). The processes in S6002 and S6003 correspond to that in S5003 of FIG. 5.

With the above processing, information terminal A is in a state in which a push scan can be performed from the image forming apparatus 100.

A case in which registration processing of information terminal B is performed and fails will be described next.

Information terminal B searches for a registered terminal (S6004). In this search processing, information terminal B transmits a UDP broadcast, as described above.

Information terminal A is a registered terminal, and stands by for a deregistration request in S5004 of FIG. 5. Thus, upon receiving the UDP broadcast, information terminal A returns a response (S6005). This corresponds to S5001 of FIG. 5, and information terminal B advances the process to S5002.

Information terminal B transmits a deregistration request to information terminal A (S6006).

Information terminal A internally performs deregistration determination (S6007). This corresponds to S5006 of FIG. 5. In this case, information terminal A determines that no deregistration is performed. Thus, information terminal A transmits the non-deregistration status to information terminal B (S6008). Since information terminal A is not deregistered by information terminal B in FIG. 6, information terminal A returns the non-deregistration status as a response in S5007 of FIG. 5. After S5007 of FIG. 5, the process advances to S5004 and information terminal A stands by for a deregistration request. While information terminal A stands by for a deregistration request, it remains registered in the image forming apparatus 100, and is a push scan target.

On the other hand, since the deregistration request of information terminal B fails in S5002 of FIG. 5, the process is terminated.

A case in which information terminal B is set as a push scan target will now be described with reference to FIG. 7. Note that processes in S7001 to S7006 correspond to those in S6001 to S6006 of FIG. 6. The processing contents are the same and a description thereof will be omitted.

Information terminal A internally performs deregistration determination (S7007). The difference from FIG. 6 is that deregistration is determined to be performed in this processing. Information terminal A performs deregistration processing for the image forming apparatus 100 (S7008).

The image forming apparatus 100 returns, to information terminal A, deregistration completion information indicating that deregistration has been performed. The processes in S7008 and S7009 correspond to that in S5008 of FIG. 5.

Information terminal A transmits the deregistration status to information terminal B (S7010). The processing in S7010 corresponds to S5009 of FIG. 5, and the processing of information terminal A ends.

Information terminal B recognizes that the deregistration request has succeeded in S5002 of FIG. 5, and thus the process advances to S5003.

Information terminal B performs registration processing for the image forming apparatus 100 (S7011). In this registration processing, information terminal B can be registered, since information terminal A registered first has been deregistered.

The image forming apparatus 100 determines that registration has succeeded, and returns a response (registration completion) (S7012). The processes in S7011 and S7012 correspond to that in S5003 of FIG. 5.

With the above processing, information terminal A registered first is deregistered, and information terminal B registered later is set as a push scan target.

No information terminal is registered during a period from the deregistration processing (S7008) of information terminal A to the registration processing (S7011) of information terminal B. During this period, therefore, information terminal A may unwantedly perform registration processing. The above unregistration period may be a negligibly short time depending on the processing speed. If, however, the unregistration period is not negligible according to the processing speed, information terminal A can handle this by extending a period during which it listens to the UDP broadcast until the registration processing (S7011) is completed. Information terminal A may be configured not to perform registration processing during the listening period. Also, during the above period, a third-party information terminal other than information terminals A and B may unwantedly perform registration processing. To solve this problem, the image forming apparatus 100 may be configured not to accept new registration processing during a predetermined period after deregistration is performed. The predetermined period is set, as needed, in accordance with the time from when the deregistration processing is performed until the registration processing of information terminal B is performed in S7011.

Alternatively, in the deregistration processing in S7008, the image forming apparatus 100 may be notified of the identification information of an information terminal (for example, information terminal B) to be newly registered. The image forming apparatus 100 may be configured to deregister information terminal A, and not to register any terminal whose identification information does not coincide with the above identification information during the predetermined period.

Furthermore, if the image forming apparatus 100 is notified of the identification information of the information terminal (for example, information terminal B) to be newly registered in the deregistration processing as described above, the new information terminal (information terminal B) may be registered simultaneously with deregistration. This arrangement can prevent the above unregistration period from occurring. Furthermore, the arrangement may produce an effect that information terminal B need not perform the registration processing in S7011.

Processing of determining an information terminal registered as a push scan transmission destination when a user instruction for a push scan is issued to the image forming apparatus 100 will now be described.

As an example of the above processing, for example, the image forming apparatus 100 may specify a registered information terminal, and transmit scan data to only the specified information terminal. When, for example, a button for a push scan is pressed in the image forming apparatus 100 while an information terminal on the network performs polling, the information terminal transmits, to the image forming apparatus 100, the identification information of itself together with a scan instruction. Under the condition that the received identification information coincides with the identification information of the registered information terminal stored in the flash memory 112, the image forming apparatus 100 transmits scan data to the information terminal.

That is, by determining a registered information terminal by the image forming apparatus 100, it is possible to prevent scan data from being transmitted when an unregistered information terminal issues a scan instruction. Note that if the above two pieces of identification information do not coincide with each other, a document need not be scanned.

As another example of the above determination processing, for example, an information terminal may determine whether it has been registered. For example, the image forming apparatus 100 returns the identification information of the information terminal registered in itself as a response to polling from the information terminal. If the returned identification information coincides with the identification information of its own, the information terminal issues a scan instruction to the image forming apparatus 100. With this processing, when the button for a push scan is pressed, the image forming apparatus 100 can appropriately transmit scan data to the registered information terminal without determining whether the information terminal which is performing polling has been registered.

As still another example, an information terminal may determine whether it has been registered. If the information terminal itself has not been registered, it need not perform polling for a push scan. In this case, it is possible to construct a system so as to prevent an unregistered information terminal from performing polling. Therefore, the identification information of an information terminal registered in the image forming apparatus need not be stored.

As described above, according to the first embodiment, when registering an information terminal as a push scan transmission destination in an image forming apparatus, a deregistration request is issued to another information terminal already registered to deregister the other information terminal, thereby performing registration. Consequently, it is possible to newly register, in the image forming apparatus, an information terminal for which a push scan is to be performed, while limiting the number of information terminals registered in the image forming apparatus.

When, for example, an information terminal is registered in an image forming apparatus to be a push scan target, it is possible to limit the number of information terminals registered in the image forming apparatus to one.

According to the first embodiment, it is possible to decide an information terminal (a terminal to be newly registered or a terminal to remain registered) to be registered in an image forming apparatus by communication between a plurality of information terminals registrable in the image forming apparatus. Consequently, it is possible to register an appropriate information terminal in the image forming apparatus without performing processing of selecting an information terminal to be registered.

Note that the number of information processing apparatuses registrable in an image forming apparatus is set to one in the first embodiment. The present invention, however, is not limited to this, and a plurality of information processing apparatuses may be registrable.

There is also a case in which old registration processing software incorporating no processing of the flowchart of FIG. 5 of the first embodiment is included on the network. In this case, the old registration processing software may execute registration processing for an image forming apparatus in which the number of registered information processing apparatuses is limited to one. In this case, in the registration processing in S5003, registration from the old registration processing software can be disabled by limiting registration by a software version or the like. As a result, software which can perform registration in an image forming apparatus in which the number of registered information processing apparatuses is limited to one is limited to new software incorporating the flowchart of the first embodiment. Thus, even if a plurality of information terminals on the network incorporate new and old software programs, the number of registered information terminals can be limited to one.

<Second Embodiment>

The first embodiment has exemplified a case in which one image forming apparatus is connected on a network. However, a plurality of image forming apparatuses may be connected. In this case, the upper limit number of registered information terminals may be set in some of the image forming apparatuses. If the upper limit number is set, it is only necessary to perform the registration method of the first embodiment. On the other hand, if no upper limit number is set, it is necessary to perform registration processing of all information terminals each of which issues a registration request. The upper limit number may change depending on an image forming apparatus or no arrangement for confirming the upper limit number may be prepared in an image forming apparatus produced in the past and the like.

In the second embodiment, an arrangement will be described in which even if both an image forming apparatus which is limited in terms of the number of registered information terminals and an image forming apparatus which is not limited in terms of the number of registered information terminals are included, registration processing is performed for the image forming apparatus which is limited in terms of the number of registered information terminals.

Note that the software arrangement of an image forming apparatus 100 and an information terminal 200 according to the second embodiment is the same as in the first embodiment and a detailed description thereof will be omitted.

Figure 11:
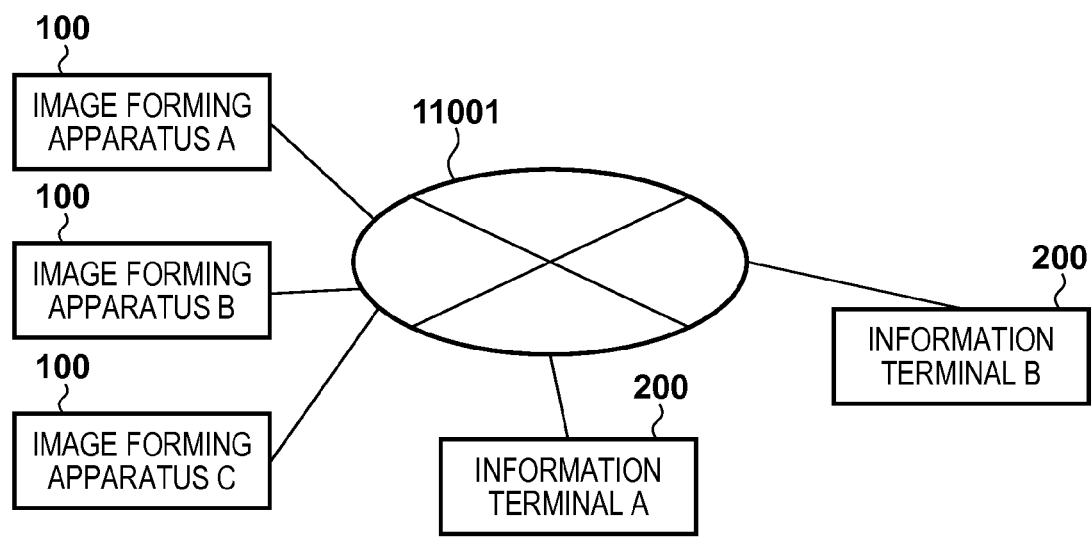
FIG. 11 is a block diagram showing a network according to the second embodiment.

FIG. 11 is a block diagram showing the schematic arrangement of a network system including the image forming apparatuses 100 shown in FIG. 1 and the information terminals 200 shown in FIG. 2.

Referring to FIG. 11, the plurality of image forming apparatuses 100 and the plurality of information terminals 200 are connected to a local area network 11001. A case in which the apparatuses are connected to a wired network will be exemplified with reference to FIG. 11 and subsequent drawings. However, the apparatuses may be connected to a wireless network or a network including both a wired network and a wireless network.

The plurality of image forming apparatuses 100 (image forming apparatuses A, B, and C) and the plurality of information terminals 200 (information terminals A and B) are connected on the local area network 11001. In the following description, the three image forming apparatuses 100 will be referred to as image forming apparatuses A, B, and C to discriminate them. Similarly, the two information terminals 200 will be referred to as information terminals A and B to discriminate them. Note that the names are not limited to them, and the number of image forming apparatuses and that of information terminals connected on the local area network 11001 are not limited to them.

In this example, for image forming apparatus A, the number of registrable information terminals (to be referred to as a registrable count hereinafter) is limited to one. For each of image forming apparatuses B and C, the registrable count is limited to 64. Image forming apparatus B has a function of returning the registrable count. Upon receiving a command to acquire the registrable count from an information terminal, image forming apparatus B can return the registrable count as a response. On the other hand, image forming apparatus C has no function of returning the registrable count. Even if image forming apparatus C receives a command to acquire the registrable count from an information terminal, it returns an unknown command error as a response.

Note that in the second embodiment, a flash memory 112 of the image forming apparatus 100 stores the registrable count in addition to identification information for identifying a registered terminal as registration information about an information terminal. In response to a command from the information terminal 200, the image forming apparatus 100 returns the registrable count included in the registration information to the information terminal 200.

Figure 12:
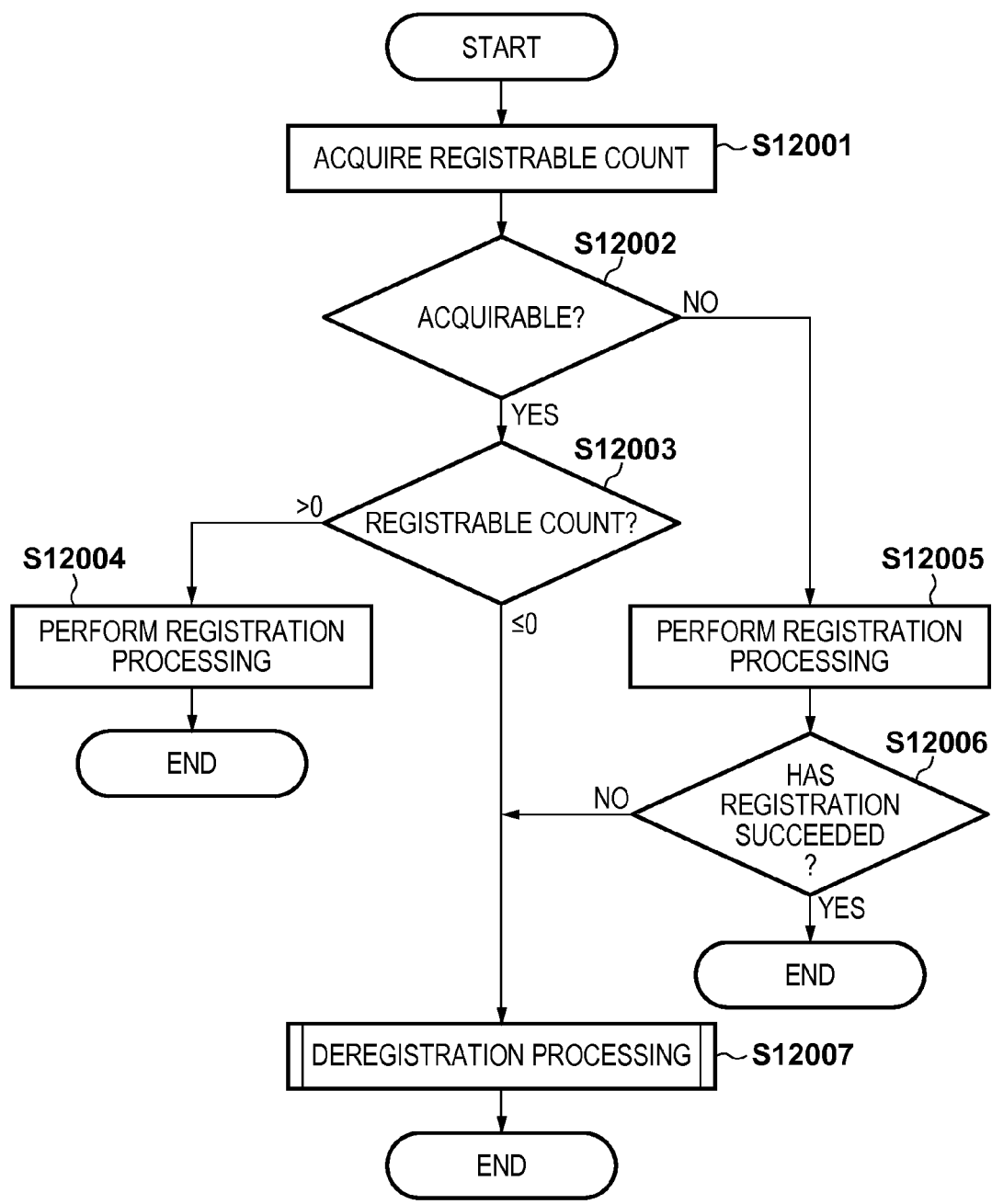
FIG. 12 is a flowchart according to the second embodiment.

Processing when registering/deregistering the information terminal 200 in/from the image forming apparatus 100 will now be described with reference to the flowchart of FIG. 12. Processing shown in FIG. 12 is implemented when a CPU 201 of the information terminal 200 executes application software 301.

In S12001, the information terminal 200 transmits a command to acquire the registrable count (the remaining registrable count) to the image forming apparatus 100 to which the information terminal 200 issues a registration request of itself, and receives a response from the image forming apparatus 100.

In S12002, based on the received response, the information terminal 200 determines whether it can acquire the registrable count. If the information terminal 200 cannot acquire the registrable count (NO in S12002), the process advances to S12005. On the other hand, if the information terminal 200 can acquire the registrable count (YES in S12002), the process advances to S12003.

In this determination processing, for example, if a response is received from image forming apparatus C, the response indicates an unknown command error, and thus the information terminal 200 cannot acquire the registrable count. The process then advances to S12005.

If it is determined in S12002 that the registrable count can be acquired, the information terminal 200 determines in S12003 whether the registrable count is equal to or larger than a predetermined number. Assume that the predetermined number is one. If, therefore, the registrable count is equal to or larger than the predetermined number (one), it is possible to register the information terminal 200 in the image forming apparatus 100 in S12004, and thus the information terminal 200 performs registration processing in the image forming apparatus 100, thereby terminating the process. On the other hand, if the registrable count is smaller than the predetermined number, the information terminal 200 performs deregistration processing in S12007. The deregistration processing corresponds to the processing shown in the flowchart of FIG. 5 of the first embodiment.

In this determination processing, for example, if a response is received from image forming apparatus A whose registrable count is limited to one, "1" is returned as the registrable count when no information terminal has been registered in image forming apparatus A and "0" is returned when an information terminal has already been registered.

If it is determined in S12002 that the registrable count cannot be acquired (NO in S12002), the information terminal 200 attempts, in S12005, to perform registration processing in the image forming apparatus 100. After that, the information terminal 200 determines whether the registration processing has succeeded. If registration has succeeded (YES in S12006), the process ends. On the other hand, if registration has failed (NO in S12006), the information terminal 200 performs deregistration processing in S12007.

Note that a case in which registration fails may be a case in which the number of information terminals registered in the image forming apparatus 100 has already reached the upper limit of the registrable count.

If the registrable count is smaller than one or registration has failed, the information terminal 200 performs deregistration processing for the image forming apparatus 100. In this processing, for example, the deregistration processing executed in the flowchart of FIG. 5 of the first embodiment is performed.

As described above, according to the second embodiment, when an image forming apparatus can return an information terminal registrable count, it is possible to switch between registration processing and the processing shown in the flowchart of FIG. 5 of the first embodiment in accordance with the returned registrable count. Consequently, in the image forming apparatus which can return the registrable count, it is possible to prevent the situation in which the number of registered information terminals exceeds the registrable count to disable registration as a result of attempting registration processing. Furthermore, even if a plurality of image forming apparatuses are connected on a network and the information terminal registrable counts of the respective image forming apparatuses are different from each other, it is possible to appropriately switch processing.

In addition, even if an image forming apparatus cannot return the information terminal registrable count, it is possible to attempt registration processing, and perform the processing shown in the flowchart of FIG. 5 of the first embodiment in accordance with the result of the registration processing. Therefore, even if a plurality of image forming apparatuses are connected on a network and some of them cannot return the information terminal registration counts, it is possible to perform the processing shown in the flowchart of FIG. 5 of the first embodiment after attempting registration processing only in this case.

As described above, even if a plurality of image forming apparatuses are connected to a network and some of them cannot return the information terminal registrable counts, it is possible to perform appropriate registration processing in each image forming apparatus. There is a case in which a plurality of image forming apparatuses are connected on a network and the information terminal registrable counts of some of the image forming apparatuses are limited to one. In this case as well, the above arrangement can limit the information terminal registrable counts to one without influencing registration processes by other image forming apparatuses.

Furthermore, it is possible to prevent an information terminal in use from being deregistered against the user's intention by limiting a deregistration method.

Note that the information terminal registrable count (remaining registrable count) of the image forming apparatus is acquired in S12001. The present invention, however, is not limited to this. For example, if each information terminal stores the total number of information terminals registrable in the image forming apparatus, the number of information terminals already registered in the image forming apparatus may be acquired in S12001. This allows the information terminal to grasp the remaining registrable count. Note that the total number may be transmitted from the image forming apparatus to the information terminal on the network at, for example, an arbitrary timing. Alternatively, if the total number is set for each image forming apparatus model, it may be determined in accordance with the model of an image forming apparatus to which the information terminal issues a registration request.

<Third Embodiment>

In the first embodiment, the upper limit number of information terminals registrable in an image forming apparatus is one. However, the upper limit number may be set to a plural number (two or more). For example, if the upper limit number is set to two, it is possible to switch a push scan transmission destination without arranging a display device such as an LCD by providing two operation portions (operation portions 109 in FIG. 1) in the image forming apparatus. Alternatively, the image forming apparatus may include a display portion, and the user may select an information terminal as a transmission destination on the display portion at the time of a push scan. In this case, setting the upper limit number of registrable information terminals can limit selection candidates, thereby facilitating a selection operation by the user.

Even if the upper limit number is two or more, it is necessary to perform registration processing when the upper limit number of information terminals registrable in the image forming apparatus is exceeded.

In the third embodiment, registration processing in such case will be described.

Note that the software arrangement of an image forming apparatus 100 and an information terminal 200 according to the third embodiment is the same as in the first embodiment and a detailed description thereof will be omitted.

Figure 13:
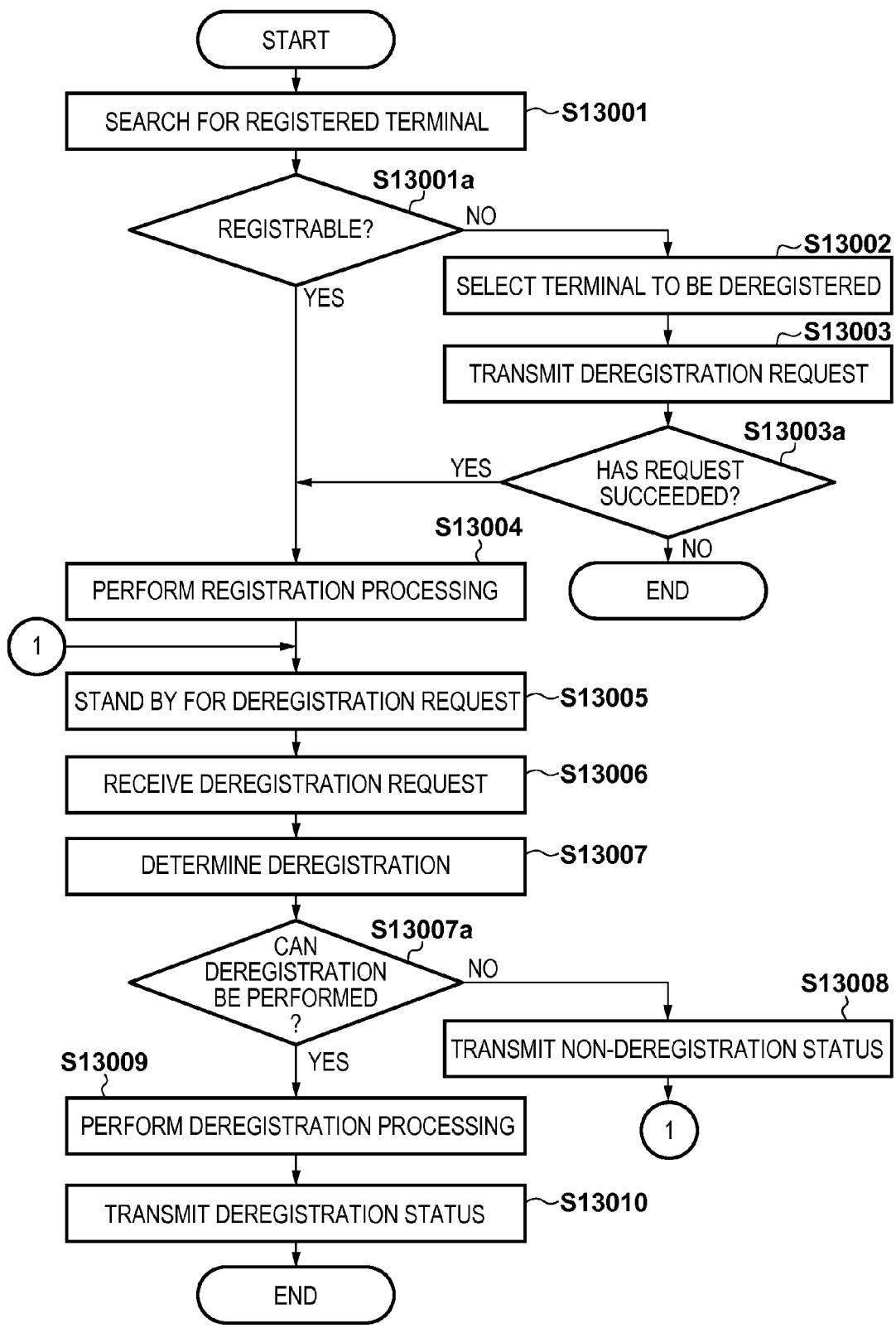
FIG. 13 is a flowchart according to the third embodiment.

Processing when registering/deregistering the information terminal 200 in/from the image forming apparatus 100 will now be described with reference to the flowchart of FIG. 13. Processing shown in FIG. 13 is implemented when a CPU 201 of the information terminal 200 executes application software 301.

In S13001, the information terminal 200 searches for a registered terminal. This processing corresponds to S5001 of FIG. 5. In S13001a, based on the number of found registered terminals, the information terminal 200 determines whether it can register itself in the image forming apparatus 100 as a registration target. This determination processing is performed depending on whether the number of found registered terminals is smaller than the upper limit number of information terminal registrable in the image forming apparatus 100 as a registration target. Note that a registrable count may be set in advance in the application software 301, or may be acquired, before or after S13001, from the image forming apparatus in which the information terminal is to be desirably registered.

If registration is possible (YES in S13001a), that is, if the number of found registered terminals is smaller than the upper limit of the registrable count, the process advances to S13004. On the other hand, if the number of found registered terminals is equal to or larger than the upper limit of the registrable count (NO in S13001a), the process advances to S13002.

In S13002, the information terminal 200 selects, from the plurality of other found registered terminals, a registered terminal to which a deregistration request is to be transmitted (an information terminal to be deregistered (deregistration terminal)). For example, a UI shown in FIG. 14 is displayed on a display portion 205 of the information terminal 200, and an information terminal to be deregistered (deregistration terminal) is selected based on a user operation to the UI. FIG. 14 shows a state in which information terminals B and C are displayed in a registered terminal list 14003, and information terminal C is selected as a deregistration terminal. In this case, subsequent deregistration processing is performed for information terminal C.

Note that when the CPU 201 of the information terminal 200 executes the application software 301, the UI shown in FIG. 14 is displayed.

Subsequent processes in S13003 to S13010 correspond to those in S5002 to S5009 in the first embodiment. The processing contents are the same and a description thereof will be omitted.

As described above, according to the third embodiment, it is possible to obtain the following effect in addition to the effects described in the first and second embodiments. That is, according to the third embodiment, even if the upper limit number of information terminals registrable in an image forming apparatus is set to two or more, it is possible to perform appropriate registration processing by selecting another information terminal to be deregistered in deregistration processing.

<Fourth Embodiment>

In the following description, WSD stands for Web Service on Devices, and represents a protocol.

Furthermore, Scan Service Definition Version 1.0 of WSD indicates a Scan Service using WSD, which is defined by Microsoft, USA.

This embodiment can be implemented by using a service and protocol other than the above-described network protocol. For example, the Windows 8® OS provided by Microsoft can implement a push scan via a network using the WSD Scan Service, and can also use the WSD Scan Service.

In the fourth embodiment, a push scan using the WSD Scan Service will be described.

Note that the software arrangement of an image forming apparatus 100 and an information terminal 200 according to the fourth embodiment is the same as in the first embodiment and a detailed description thereof will be omitted.

Figure 15:
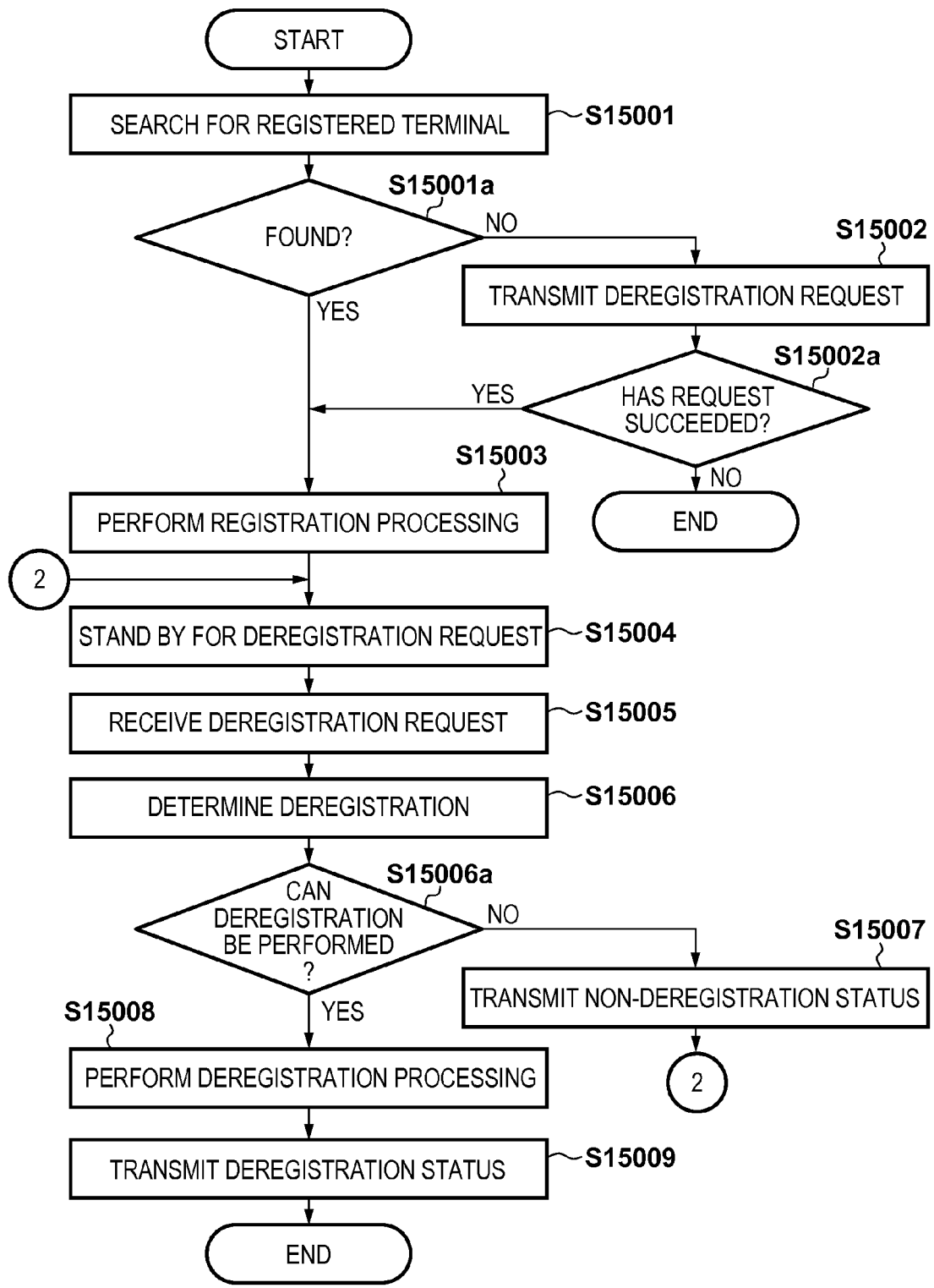
FIG. 15 is a flowchart according to the fourth embodiment.

Processing when registering/deregistering the information terminal 200 in/from the image forming apparatus 100 will now be described with reference to the flowchart of FIG. 15. Processing shown in FIG. 15 is implemented when a CPU 201 of the information terminal 200 executes application software 301.

As preprocessing of the flowchart, the information terminal 200 receives a message from the image forming apparatus 100 in response to a WS-Discovery message issued by the information terminal 200. More specifically, the information terminal 200 receives a Hello message response or a WSD Hello message from the image forming apparatus 100 at the time of activation of the image forming apparatus 100. Assume that an image forming apparatus in which an event is to be registered has been found by a WS-Eventing Probe message.

Processes in S15001 to S15002 correspond to those in S5001 to S5002 of FIG. 5 of the first embodiment. The processing contents are the same and a detailed description thereof will be omitted.

In S15003, the information terminal 200 performs registration processing of registering itself in the image forming apparatus 100. The information terminal 200 completes registration by, for example, transmitting a WS-Eventing Subscribe message to the image forming apparatus 100.

In S15004, the information terminal 200 stands by for reception of a deregistration request. Similarly to S15001, the information terminal 200 stands by to listen to a UDP broadcast. If another information terminal transmits a UDP broadcast, processing of registering the other information terminal is performed to receive a deregistration request of the self information terminal (S15005). Note that in processing such as end processing of a registered terminal, the registered terminal may want to deregister itself. In this case, even if no other information terminal transmits a UDP broadcast, the registered terminal can end this step and deregister itself by transmitting a WS-Eventing Unsubscribe message to the image forming apparatus 100. In WSD, the image forming apparatus 100 transmits a WSD Bye message before it is powered off. Upon receiving the Bye message, the information terminal 200 ends this step.

Processes in S15005 to S15009 correspond to those in S5005 to S5009 of FIG. 5 of the first embodiment. The processing contents are the same and a detailed description thereof will be omitted. Note that deregistration in S15008 is completed when, for example, the information terminal 200 transmits a WS-Eventing Unsubscribe message to the image forming apparatus 100.

Note that the fourth embodiment assumes a case in which the number (registrable count) of information terminals registrable in the image forming apparatus 100 is limited to one. The arrangement of the third embodiment in which the registrable count is confirmed with the image forming apparatus 100 and then processing is executed is also applicable.

In the fourth embodiment, the registrable count can be confirmed with the image forming apparatus 100 by the following method. That is, a custom element is added as private information of GetScannerElements (the definition of a name space: xmlns:ans=http://www.abc.xxx/ns/wdp/scan/v100). It is then possible to acquire the registrable count by setting it in the custom element.

FIG. 16 shows a GetScannerElements message.

FIG. 17 shows an example of a GetScannerElementsResponse message as a response. The information terminal 200 includes, in the GetScannerElements message shown in FIG. 16, an element 16001 of <wscn:Name>wscn:ScannerDescription</wscn:Name> for acquiring the registrable count of the image forming apparatus 100.

The information terminal 200 receives the GetScannerElementsResponse message shown in FIG. 17. The information terminal 200 reads an element 17001 of <ans:AvailableSubscriptionUnits>1</ans:AvailableSubscriptionUnits>. This makes it possible to acquire the registrable count of the image forming apparatus 100.

In the fourth embodiment, the element 17001 is used as private information (the definition of the name space: xmlns:ans="http://www.abc.xxx/ns/wdp/scan/v100"). The present invention, however, is not limited to this. If, for example, the OS has the similar function, public information (the definition of a name space: wse="http://www.yyyy.xxx/YYYY/MM/ws-evt") is used.

More specifically, an element of <wse:AvailableSubscriptionUnits>1</wse:AvailableSubscriptionUnits> may be used instead of the element 17001.

As described above, according to the fourth embodiment, even if a push scan is implemented using the WSD protocol, when an information terminal is registered in an image forming apparatus to be a push scan target, the number of information terminals registered in the image forming apparatus can be limited to one.

Furthermore, if an old OS incorporating no function of implementing the processing shown in each flowchart of the above embodiments is included on a network, it may execute registration processing for an image forming apparatus whose registrable count is limited to one. In this case, by installing software of implementing the processing shown in the flowchart of FIG. 15 in the old OS, it is possible to limit the registrable count to one even if both new and old OSs are included on the network.

Note that if 16 is set in the element 17001 to describe <ans:AvailableSubscriptionUnits>16</ans:AvailableSubscriptionUnits>, the registrable count is limited to 16. In this way, it is possible to set the upper limit number of information terminals registrable in an image forming apparatus to two or more in accordance with the specifications of the image forming apparatus.

<Fifth Embodiment>

In each of the aforementioned embodiments, a case in which an information terminal which has received a deregistration request executes deregistration processing for the image forming apparatus 100 has been described. The present invention, however, is not limited to this. For example, an information terminal which has issued a deregistration request may perform deregistration processing. More specifically, the information terminal receives, from a registered information terminal, deregistration permission as a response to the deregistration request. Upon receiving the deregistration permission, the information terminal may perform processing of deregistering the registered information terminal from the image forming apparatus 100.

In each of the aforementioned embodiments, when a given information terminal registers itself, it executes the confirmation processing (S5001) of confirming whether another information terminal has already been registered. However, the present invention is not limited to this, and the above confirmation processing may be executed at an arbitrary timing. For example, the confirmation processing may be performed in response to a user instruction to the application software 301. More specifically, the user may instruct the confirmation processing, and the application software 301 may display the presence/absence of another registered information processing apparatus. The user may then confirm the display with the information terminal, and transmit a deregistration request in S5002 or instruct the registration processing in S5003. Similarly, a deregistration request may be transmitted at an arbitrary timing in S5002.

Furthermore, the processing of searching for a registered information terminal in S5001 and the processing of transmitting a deregistration request in S5002 may be performed by one instruction from the user. That is, in response to one instruction from the user, the search processing in S5001 may be performed, and a deregistration request may be automatically transmitted in S5002 based on the result of the search processing. Alternatively, in response to a registration instruction from the user, the processes in S5001 to S5003 may be automatically executed.

Search processing may be performed in response to a search instruction from the user, and the result may be displayed on an information terminal. After the user confirms the display, he/she may additionally issue a registration instruction or deregistration request instruction.

In each of the aforementioned embodiments, a case in which a push scan is performed as a service provided by the image forming apparatus 100 has been exemplified. The present invention, however, is not limited to this. Each of the aforementioned embodiments is applicable to a case in which, for each of various services provided by an image forming apparatus, the number of information terminals which can use the service is limited. For example, each of the aforementioned embodiments may be applied to a case in which an operation on the image forming apparatus side decides an information terminal apparatus from which print data is received, and the print data is received from the information terminal apparatus. A device which provides a service is not limited to an image reading apparatus and printing apparatus, and may be, for example, a digital camera, PC, or Web server. As for a digital camera, processing of transmitting a shot image to an information processing apparatus may be provided as a service by the digital camera. Alternatively, as for a PC or Web server, processing of transmitting various data to an information processing apparatus or processing of receiving data may be provided as a service.

Examples of an information processing apparatus to which the device provides a service are a PC, a Web server, and mobile devices such as a digital camera, smartphone, and tablet.

In the above embodiments, a case in which an information processing apparatus which is provided with a service, among a plurality of information processing apparatuses, is registered in a device which provides the service. The present invention, however, is not limited to this. In an information processing apparatus provided with a service, registration information as an apparatus which is provided with the service may be stored. In this case, an information processing apparatus which stores no registration information is prevented from requesting execution of the service (for example, instructing a push scan). Alternatively, when the information processing apparatus requests execution of the service, it may transmit the registration information to a device (for example, a scanner), and the device may provide the service (for example, transmit scan data) in response to only the request including the registration information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-039291, filed Feb. 28, 2014, which is hereby incorporated by reference wherein in its entirety.

What is claimed is:

1. An information processing apparatus which uses predetermined processing by a predetermined device, comprising:
 a registration unit configured to perform registration so as to allow said information processing apparatus to use the predetermined processing of the predetermined device;
 a confirmation unit configured to confirm a registration state of an other information processing apparatus capable of using the predetermined device, by communicating with the other information processing apparatus; and
 a deregistration unit configured to perform deregistration processing for deregistering the other information processing apparatus, if a confirmation results of said confirmation unit indicates that the other information processing apparatus is already registered as an apparatus which uses the predetermined processing of the predetermined device,
 wherein said registration unit performs the registration based on the deregistration processing by said deregistration unit.

2. The apparatus according to claim 1, wherein said deregistration unit requests the other information processing apparatus to perform deregistration as the deregistration processing, thereby causing the other information processing apparatus to perform deregistration.

3. The apparatus according to claim 1, wherein in a case that the other information processing apparatus is in a predetermined state, said deregistration unit deregisters the other information processing apparatus.

4. The apparatus according to claim 1, wherein in a case that a predetermined condition for an image forming apparatus is satisfied, said deregistration unit deregisters the other information processing apparatus.

5. The apparatus according to claim 1, wherein in a case that registration by said registration unit fails, said deregistration unit deregisters the other information processing apparatus.

6. The apparatus according to claim 1, wherein
 the predetermined device is a reading apparatus configured to read a document and transmit a read image obtained by the reading as the predetermined processing, and
 said registration unit registers the information processing apparatus as a transmission destination of the image read by the reading apparatus.

7. An information processing method comprising:
 a confirmation step of confirming, when an information processing apparatus which uses predetermined processing by a predetermined device communicates with an other information processing apparatus capable of using the predetermined device, a registration state of the other information processing apparatus; and a deregistration step of deregistering the other information processing apparatus, if a confirmation results in said confirmation step indicates that the other information processing apparatus is already registered as an apparatus which uses the predetermined processing of the predetermined device, wherein the information processing apparatus is registered to use the predetermined device based on the deregistration processing in the deregistration step.

8. The method according to claim 7, wherein in said deregistration step, the other information processing apparatus is requested to perform deregistration as the deregistration processing, thereby causing the other information processing apparatus to perform deregistration.

9. The method according to claim 8, wherein in said deregistration step, the other information processing apparatus is requested to deregister the other information processing apparatus from the predetermined device.

10. The method according to claim 7, wherein in said deregistration step, the other information processing apparatus is requested to perform deregistration as the deregistration processing, and permission of the deregistration is received by the information processing apparatus from the other information processing apparatus, thereby deregistering the other information processing apparatus.

11. The method according to claim 7, wherein in a case that information for deregistering the other information processing apparatus is transmitted to the other information processing apparatus, and a user inputs the information in the other information processing apparatus, the other information processing apparatus is deregistered in said deregistration step.

12. The method according to claim 7, wherein in a case that the other information processing apparatus is in a predetermined state, the other information processing apparatus is deregistered in said deregistration step.

13. The method according to claim 7, wherein in a case that a predetermined condition for an image forming apparatus is satisfied, the other information processing apparatus is deregistered in said deregistration step.

14. The method according to claim 7, further comprising an acquisition step of acquiring information for specifying a remaining number of registrable information processing apparatuses from an image forming apparatus, wherein in a case that the number specified from the information acquired in said acquisition step is smaller than a predetermined number, the other information processing apparatus is deregistered in said deregistration step.

15. The method according to claim 7, wherein in a case that registration in said registration unit fails, the other information processing apparatus is deregistered in said deregistration step.

16. The method according to claim 7, further comprising a selection step of selecting, in a case that the confirmation result in said confirmation step indicates that there are a plurality of other information processing apparatuses already registered, one of the other information processing apparatuses to be deregistered in accordance with a user instruction, wherein the other information processing apparatus selected in said selection step, is deregistered in said deregistration step.

17. The method according to claim 7, wherein the predetermined device is a reading apparatus configured to read a document and transmit a read image obtained by the reading as the predetermined processing, and the information processing apparatus is registered as a transmission destination of the image read by the reading apparatus.

18. The method according to claim 17, wherein the reading apparatus transmits the read image to the transmission destination of the read image in accordance with a user instruction to the reading apparatus.

19. The method according to claim 17, wherein the registration of the information processing apparatus and the deregistration in said deregistration step is respectively performed by communicating between the information processing apparatus and the reading apparatus according to a WSD protocol.

20. A non-transitory computer-readable storage medium storing a program for causing a computer to function as an information processing apparatus which uses predetermined processing by a predetermined device, the program for performing a method comprising:

performing registration so as to allow said information processing apparatus to use the predetermined processing of the predetermined device;

confirming a registration state of an other information processing apparatus capable of using the predetermined device, by communicating with the other information processing apparatus; and performing deregistration processing for deregistering the other information processing apparatus, if a confirmation results of the confirming indicates that the other information processing apparatus is already registered as an apparatus which uses the predetermined processing of the predetermined device, wherein the performing of the registration is based on the deregistration processing.

* * * * *